United States Patent [19]

Guillon

[11] Patent Number: 4,530,186

[45] Date of Patent: Jul. 23, 1985

[54] WEATHER STRIP FOR VEHICLE WINDOWS

[75] Inventor: Henri Guillon, Vaux sur Seine, France

[73] Assignee: G.I.E. Technistan, Paris, France

[21] Appl. No.: 541,681

[22] Filed: Oct. 13, 1983

[30] Foreign Application Priority Data

Aug. 25, 1983 [FR] France .............. 83 13717

[51] Int. Cl.³ .............................................. E05D 15/16
[52] U.S. Cl. ........................................ 49/441; 49/374; 49/439
[58] Field of Search ............... 49/374, 441, 439, 489, 49/436

[56] References Cited

U.S. PATENT DOCUMENTS 3,162,281 12/1964 Kraska et al. .................. 49/374
3,479,768 11/1969 Smadja .......................... 49/441
3,653,157 4/1972 Cagebolt ........................ 49/439
3,685,206 8/1972 Kessler .......................... 49/489

FOREIGN PATENT DOCUMENTS 874714 8/1961 United Kingdom ............ 49/436

Primary Examiner—Kenneth Downey
Attorney, Agent, or Firm—Poms, Smith, Lande and Rose

[57] ABSTRACT

A weather strip consisting of a resilient elastomer or plastomer body comprising a base, two side walls, retaining lips and sealing lips. Said strip is provided with a hard elastomer or plastomer protrusion on the inside face of at least one of said walls, said protrusion being so shaped as to form together with the said base of the strip body, when in use configuration, a retaining groove for an insert allowed to slide therein. Said strip may also be provided with one or with a plurality of ribs. Application to vehicles.

9 Claims, 4 Drawing Figures

WEATHER STRIP FOR VEHICLE WINDOWS

The present invention relates to a weather strip for vehicle windows and in particular for sliding windows. Said weather strip is suitable for guiding window glasses within the window frames of vehicle doors.

There are several types of prior art weather strips for vehicle windows, particularly for sliding windows fitted with inserts, said strips being provided with a sectional steel frame.

Such weather strips have proven difficult to fabricate and install. Moreover, the metal frame of such weather strips wherein the sectional steel serves as a retaining groove and guideway for the glass-mounted insert being prone to corrosion damage, makes it necessary to use stainless steel.

This invention provides a new weather strip for vehicle windows, without a sectional steel frame.

The weather strip according to the invention is made of a resilient elastomer or plastomer material. At least one of its inside walls is provided with a protrusion of hard elastomer or plastomer shaped so that it both allows insertion of the glass-mounted insert into the weather strip and maintains said insert within the weather strip during use.

The invention will be more readily understood on reading the following description with reference to the accompanying drawings, in which.

Figure 1:
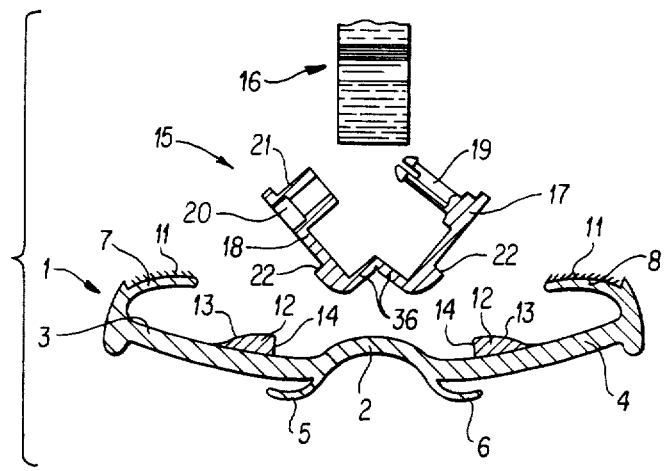
FIG. 1 is a cross-sectional view of a weather strip according to the invention, taken in a plane perpendicular to the longitudinal direction of said strip, and of the insert and the window, prior to assembly.

The weather strip according to the invention consists of a sealing strip 1 comprising a base 2 and two side walls 3 and 4. The ends of the base 2 are each provided with a retaining lip 5 and 6. The side walls 3 and 4 are each provided with a sealing end lip 7 and 8 and optionally with a wrap around lip 9 and 10 such as depicted, for example, in FIGS. 2, 3 and 4.

The sealing lips 7 and 8 are lined with a coating 11 enabling the window to slide and providing a seal. This coating 11 may for example be felt or varnish, secured to or deposited on the lips 7 and 8 by conventional means such as bonding, flocking or deposition.

The weather strip according to the invention is provided, on the inside face of at least one of its side walls, with a protrusion 12 arranged so that, when in use configuration, said protrusion forms together with the base 2 of said sealing strip 1 a retaining groove for the insert in which the said insert slides.

Figure 2:
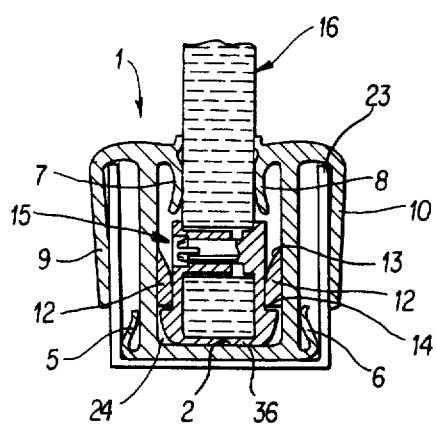
FIG. 2 is a similarly taken cross-sectional view of another embodiment of the weather strip according to the invention wherein the strip is mounted in a guide.

The term "use configuration" means, in the present specification that configuration taken by the weather strip when it is inserted into the guiding frame as depicted in FIG. 2.

Referring now to FIG. 1, the window glass 16 and the insert 15 are also shown, said insert being comprised of a hinged base 36 and two lateral sections 17 and 18, said lateral section 17 comprising a closing pin 19 and said other lateral section 18 having an orifice 20 and a cylindrical part 21 the dimensions and shape thereof are designed to take in and secure said closing pin 19 when the insert is fitted to a window glass 16 having been provided with a hole of sufficient diameter to allow passage of the pin 19.

It should be emphasized that the insert 15 depicted in FIG. 1 is an example of a well-known type of insert and that the weather strip according to the invention may be used together with any insert having a shoulder on at least one of its sides 22.

The weather strip according to the invention is particularly well suited for channel section guide rails such as depicted by item 23 of FIG. 2. As shown in FIG. 2, the insert 15, fastened to the window 16, fits into the weather strip body 1.

Advantageously, the protrusion 12, which is the essential feature of this invention, has a substantially triangular profile one of the sides whereof 13 meets at an acute angle with the inside face of the side wall 4 and another side whereof 14 is substantially parallel to the base 2 of the weather strip such that it forms together with said strip the groove 24 securing the insert.

The shoulders 22 on the side walls 17 and 18 of the insert 15 lock the said insert in the groove 24, in sliding relation therewithin, with side 14 of inside wall protrusion 12 serving as a stop for the insert shoulders 22.

In use configuration, sealing lips 7 and 8 bear on the two faces of window 16. Given the configuration of sealing lips 7 and 8 and of retaining lips 5 and 6, lips 7 and 8 apply pressure to the glass when the weather strip is in its use configuration.

Figure 3:
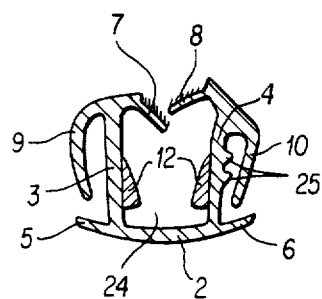
FIG. 3 and FIG. 4 are similarly taken cross-sectional views of two further embodiments of the weather strip according to the invention.
Figure 4:
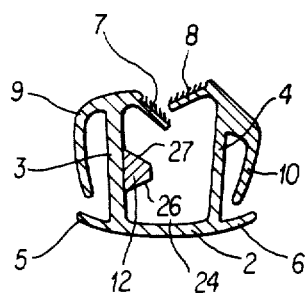

FIGS. 3 and 4, the various parts whereof correspond to the same parts in FIGS. 1 and 2, depict alternative embodiments of the weather strip according to the invention.

FIG. 3 shows a variant of the weather strip according to the invention comprising a protrusion 12 on each side wall 3 and 4 of the strip. Said strip is further provided with one or a plurality of ribs 25 on at least one of its side walls.

FIG. 4 shows another variant of the weather strip according to the invention, comprising a protrusion 12 on only one of the side walls. The protrusion is wedge-shaped; one of its sides 26 is substantially parallel to the base 2 and its other side 27 meets at an acute angle with the side wall.

Said protrusion 12, in all embodiments of the invention, runs along the full length of the sealing strip.

As previously indicated, the sealing strip, being that entity made up of the base 2, the side walls 3 and 4, the retaining lips or flaps 5 and 6, as well as the various lips 7 to 10, is made of a resilient plastomer or elastomer, such as, for example, soft rubber, whereas the protrusion 12 is made of a hard elastomer or plastomer such as, for example, hard rubber advantageously having a Shore hardness greater than 90, or reinforced rubber. Alternatively, said protrusion 12 could be made of any very stiff material, eg. polyvinyl chloride (PVC), polypropylene or comparable materials.

The strip body can be obtained by extrusion of the resilient material in accordance with known techniques. The protrusion 12 can be attached to the strip body by any suitable means for bonding a hard material to a soft material. Advantageously, the body of the strip and the protrusion 12 can be formed by coextrusion.

The coextrusion method is the preferred method for the purpose of this invention as it enables the weather strip to be fabricated in a single step, thus avoiding the operations of handling and inserting a sectional steel frame into the body of the strip as done in the prior art.

I claim:

1. A weather strip for vehicle window constructions including a channel guide rail and an insert attached to the edge margin of a glass pane and having a laterally extended surface, comprising in combination:

an elongated body member of resilient elastomeric material including a transverse section configuration of generally uniform thickness adapted to be folded when inserted into said channel guide rail to provide a base portion and spaced side wall portion;

a protrusion of hard elastomeric material on at least one side wall portion, said protrusion having a surface spaced from said base portion to form a side groove adapted to receive the laterally extending surface on said insert to slidably retain said edge margin of said glass pane;

and means on said body member adapted to hold said body member in said channel rail and in sealing relation with surfaces of said edge margin of said glass pane.

2. A weather strip as claimed in claim 1 wherein said means on said body member include retaining lips between said side wall portion and said channel rail for exerting inward pressure on said side wall portion.

3. A weather strip as claimed in claim 1 wherein said means on said body member include sealing lips extending inwardly from upper sections of said side wall portion for sealing pressure engagement with surfaces of said edge margin of said glass pane.

4. A weather strip as claimed in claim 1 wherein a protrusion is provided on the inside face of both the side wall portions.

5. A weather strip as claimed in claim 1 wherein said protrusion has a substantially triangular cross-section, one side thereof lying at an acute angle with the inside face of the associated sidewall portion, and another side thereof being substantially parallel to said base portion for forming with said base a side retaining groove for said insert.

6. A weather strip as claimed in claim 1 wherein said elongated body member is made of soft rubber and said protrusion is made of hard rubber.

7. A weather strip as claimed in claim 1 wherein said elongated body member and said protrusion extending therealong are bonded together as by co-extrusion.

8. A weather strip as claimed in claim 1 including wraparound lips extending outwardly and downwardly from said sidewall portions and adapted to embrace external surfaces of said channel rail.

9. A weather strip as claim in claim 8 wherein one sidewall portion includes a longitudinally extending rib on the outer face thereof, said rib being cooperable with said wraparound lip and adapted to embrace the adjacent sidewall of the channel rail.

* * * * *